United States Patent
Calabrez et al.

(10) Patent No.: US 6,701,359 B1
(45) Date of Patent: Mar. 2, 2004

(54) APPARATUS AND METHOD FOR MANAGING A MULTI-THREADED PERSISTENT AGENT MANAGEMENT INFORMATION BASE INCLUDING A MANAGED OBJECT INSTANCE CACHE

(75) Inventors: Carlos Eduardo Calabrez, Campinas-SP (BR); John E. Dinger, Apex, NC (US); Olaf Zimmermann, Heidelberg (DE)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/343,232

(22) Filed: Jun. 30, 1999

Related U.S. Application Data (60) Provisional application No. 60/094,334, filed on Jul. 28, 1998.

(51) Int. Cl.[7] .............................................. G06F 15/173
(52) U.S. Cl. ...................... 709/223; 709/217; 709/224; 709/248; 370/241; 707/1; 707/8; 707/9; 707/10
(58) Field of Search ................................. 709/217, 223, 709/248, 224, 318; 707/1, 8, 9, 10, 201, 202; 370/241

(56) References Cited

U.S. PATENT DOCUMENTS

| | | | |
|---|---|---|---|
| 5,303,235 A | | 4/1994 | Chan et al. |
| 5,537,547 A | | 7/1996 | Chan et al. |
| 5,553,058 A | | 9/1996 | Glitho |
| 5,583,848 A | | 12/1996 | Glitho |
| 5,726,979 A | | 3/1998 | Henderson et al. |
| 5,761,428 A | * | 6/1998 | Sidey .......................... 709/223 |
| 5,761,432 A | | 6/1998 | Bergholm et al. |
| 5,845,080 A | * | 12/1998 | Hamada et al. .............. 709/224 |
| 5,884,328 A | * | 3/1999 | Mosher, Jr. .................. 707/202 |
| 5,960,176 A | * | 9/1999 | Kuroki et al. ............... 709/223 |
| 6,003,077 A | * | 12/1999 | Bawden et al. .............. 709/223 |
| 6,081,806 A | * | 6/2000 | Chang et al. ................... 707/8 |
| 6,085,191 A | * | 7/2000 | Fisher et al. .................... 707/9 |
| 6,170,005 B1 | * | 1/2001 | Meandzija ................... 709/217 |
| 6,182,157 B1 | * | 1/2001 | Schlener et al. ............. 709/318 |
| 6,192,034 B1 | * | 2/2001 | Hsieh et al. ................. 370/241 |
| 6,212,511 B1 | * | 4/2001 | Fisher et al. .................... 707/1 |
| 6,230,210 B1 | * | 5/2001 | Davies et al. ............... 709/248 |
| 6,438,563 B1 | * | 8/2002 | Kawagoe .................... 707/201 |

* cited by examiner

*Primary Examiner*—Hosain Alam
*Assistant Examiner*—Thu Ha Nguyen
(74) *Attorney, Agent, or Firm*—Morgan & Finnegan, LLP; Joseph C. Redmond, Jr.

(57) ABSTRACT

A TMN system includes a multi-threaded persistent TMN agent and Management Information Bases (MIBs), each including a Managed Object Instance Cache The MIB is maintained in a general purpose database system in secondary storage such as a hard disk and not by a TMN agent in main memory. At run-time, incoming TMN manager operations are translated into Database Data Manipulation Language (DML, e.g. SQL DML) commands. The MIB to database mapping supports any database language. The agent process can terminate due to a system failure or other abnormal event. In such a case the object instances and their data, stored in the MIB, are saved in secondary cache memory so that they are not lost. The restarted managed agent process reflects the MIB state of the terminated managed agent process. The managed agent process allows "Multi-threaded" means or parallel processing of messages, including CMIP requests, received from manager processes.

7 Claims, 6 Drawing Sheets

APPARATUS AND METHOD FOR MANAGING A MULTI-THREADED PERSISTENT AGENT MANAGEMENT INFORMATION BASE INCLUDING A MANAGED OBJECT INSTANCE CACHE

CROSS-REFERENCE TO RELATED APPLICATIONS

This application claims the benefit of provisional application No. 60/094,334, filed Jul. 28, 1998.

This application is related to the following applications:

(1) Ser. No. 09/343,483, now U.S. Pat. No. 6,470,357 issued Oct. 22, 2002 (BC9-98-062) entitled "A System and Method of Enhanced Directory Services For Telecommunications Management Network Applications";

(2) Ser. No. 09/343,236, abandoned Nov. 15, 2002 (BC9-98-061) entitled "A System and Method For Alternate Management Of Associations Between OSI Infrastructures"; and (3) Ser. No. 09/343,729 (BC9-98-060) entitled "A System And Method For Application Independent Association Control Using Directory Services For Parameter Modification, Dynamic Directory Updates And Changing Association Control Types," all assigned to same assignee as the present application, fully incorporated herein by reference and filed concurrently on Jun. 30, 1999.

BACKGROUND OF THE INVENTION

1. Field of the Invention

This invention relates to transmission management systems and methods of operation. More particularly, the invention relates to a telecommunications management network system and method for mapping a multi-threaded persistent agent management information base to a configurable data base to store managed objects, attributes and internal implementation details.

2. Description of Prior Art

In the Telecommunication Management Network ("TMN") framework within the Open System Interconnection ("OSI") Environment ("OSIE"), a TMN agent can make management information available to a TMN manager. Normally, TMN agents make management information available by providing an open common management information protocol ("CMIP") interface to TMN managers. The information that the TMN agent provides is contained in a logical database called a Management Information Base ("MIB").

A MIB contains a hierarchy of managed object instances. The object class characteristics of these managed object instances are described according to guidelines for the definition of managed objects ("GDMO"), an object-oriented specification language. The externally observable data values of managed object instances are contained in attributes. The Abstract Syntax Notation One ("ASN.1") industry standard is used to define the data types for these attributes.

Currently GDMO/ASN.1 is mapped only to SQL data definition language ("DDL"). These mappings are fixed format and not configurable. For example, the mapping from GDMO classes and attributes, and the attributes ASN.1 types, is not configurable for different managed agent processes. Moreover, the structured query language ("SQL") database language is the only supported target database language. Existing solutions comply with the industry specifications that define the development environment and result in non-configurable mapping.

Thus, existing solutions do not provide configurable runtime environments, or persistent managed agent functions, such as CMIP request mapping, managed object instance ("MOI") caching, or multi-threading. Further, current solutions do not support both domestic and international data structures.

The TMN/OSI framework standardizes managed object class definitions, their attributes, and data types that TMN agents make visible at the CMIP interface. These standards fail to disclose how the TMN agents are implemented. For example, it would be beneficial for the TMN agent to have additional internal variables available in the agents themselves, and user defined data available in the managed objects. These internal variables are related to the standard behavior of TMN agents. The user-defined data is not necessarily related to the standard behavior of the TMN agents, and may contain any implementation-specific data which is needed. Neither the internal variables nor the user-defined data is visible at the CMIP interface.

It is therefore desirable to have a configurable mapping that supports a variety of database languages, and which allows for the extension of the managed objects in the TMN agents to contain internal variables, and user defined data. Existing systems fail to provide a method for rapidly recovering from an agent process termination. Thus, it is desirable to have a persistent MIB that can be used to rapidly restart the terminated agent process.

SUMMARY OF THE INVENTION

An object of this invention is a multi-threaded persistent TMN agent, which supports configurable database schema mapping.

Another object is storing externally visible data, including managed objects and attributes, and internal variables and user defined data in a configurable and database-independent method.

These and other objects, features and advantages are achieved in a TMN system which includes persistent Management Information Bases (MIBs), configurable database schema mappings, database independent commands, and multithreaded message processing. The MIB is maintained in a general purpose database management system in secondary storage such as a hard disk and not by a TMN agent in main memory. Making the TMN MIB persistent requires both a static and a dynamic solution. With a persistent MIB, agent restart is faster. The MIB includes TMN managed object data. CMIP interface data, internal variables, and user defined data. The CMIP interface data pertains to the TMN managed objects and can include a distinguished name, object class, name binding, and attribute values for each TMN managed object. Internal variables can include "next notification identifier" and "packages information." Both CMIP interface data and Internal variables are defined in the standards. User defined data can include any information which a user may require for the the implementation. A GDMO/ASN.1 to Database Data Definition Language ("DDL") mapping is defined at development time. At runtime, incoming TMN manager operations are translated into Database Data Manipulation Language (DML, e.g. SQL DML) commands. Moreover, non-TMN data structures used to implement behaviors of the Managed Objects are supported. The MIB to database mapping supports any database language. The MIB is persistent because a persistent MIB continues to exist even after an agent process supporting the MIB is terminated. The agent process can terminate due to a system failure or other abnormal event. In such a case the object instances and their data, stored in the MIB, are saved in secondary memory so that they are not lost. The restarted managed agent process reflects the MIB state of the terminated managed agent process. The managed agent process allows "Multi-threaded" means or parallel processing of messages, including CMIP requests, received from manager processes.

DESCRIPTION OF THE DRAWINGS

The invention will be further understood from the following detailed description of a preferred embodiment taken in conjunction with the appended drawings (The first digit indicates the drawing in which the element first appears; Like reference numbers indicate similar elements), in which:

FIG. 6 is a representation of MIB to database mapping method used in the system of

FIG. 1.

DETAILED DESCRIPTION

Figure 1:
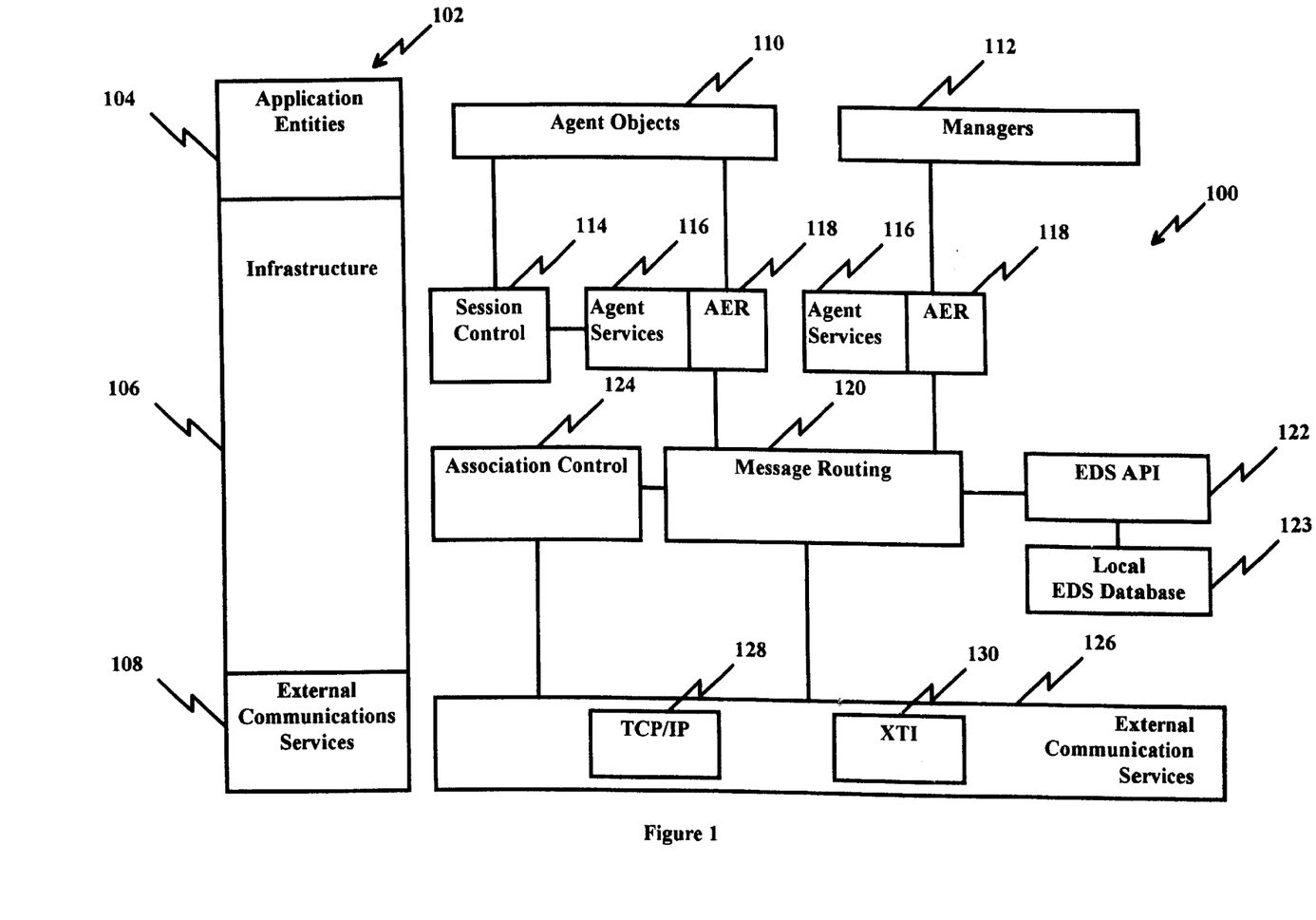
FIG. 1 is a representation of a telecommunication management network incorporating the principles of the present invention.

In FIG. 1, a telecommunication management network ("TMN") 100 is illustrated in relation to a protocol hierarchy 102. The protocol hierarchy 102 consists of an application entities layer 104, an infrastructure layer 106, and an external communications services layer 108. The elements of the TMN 100 correspond with the elements of the protocol hierarchy 102 to their right.

Figure 2:
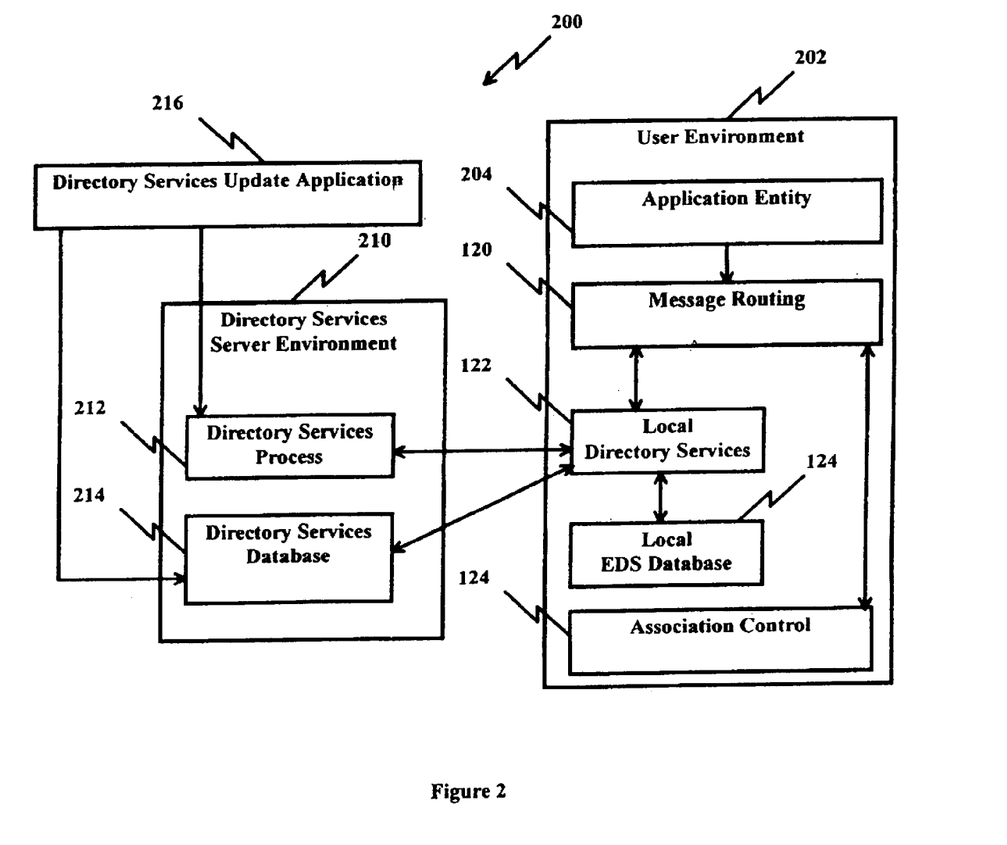
FIG. 2 is a representation of a system configuration of elements from FIG. 1.

In FIG. 2, a system configuration 200 is show with a User Environment 202, a Directory Services Server Environment 210, and a Directory Services Update Application 216. The directory services server environment 210 includes a directory services process 212, also known as a directory services daemon, and a directory services database 214. The directory services process 212 communicates with the directory services update application 216 and the local directory services 214.

Returning to FIG. 1, the TMN 100 is designed to be a run-time environment for TMN communication utilizing improved associations control 124, message routing 120, and an enhanced directory services API 122. An application, for example an agent object 110 or a manager 112, communicates with another application utilizing the TMN 100 environment. Applications communicate directly with application entity representation ("AER") 118 or a session control 114. The AER 118 accesses agent services 116 when appropriate to process service requests. The AER 118 communicates with the message routing 120, which interfaces with the external communication services 126. External communication services 126 can include the transmission control protocol/internet protocol ("TCP/IP") stack 128 or the X/Open Transport Interface ("XTI") stack 130. Message routing 120 route messages using information retrieved from association control 124 and the local directory services 122.

Before describing FIGS. 3–6, the following description applies to a development environment, and a run-time environment in the system of FIGS. 1 and 2. The development environment comprises software and procedures used to specify the agent's MIB-to-database mapping and to produce the agent's executable software. The run-time environment comprises the operational infrastructure in which the agent's executable software performs its intended function.

The TMN Agent's MIB-to-Database mapping is applicable to any TMN Agent's MIB. The existing GDMO/ ASN.1 standards are used to define the standard MIB which is used as input to the mapping activity. In order to provide flexibility and performance enhancements in the run-time environment, the mapping in the present invention is configurable in the development environment.

Three elements are associated with each managed object instance ("MOI"). They are a "local id", an optional "stream of persistent attribute values", and optional "individual persistent attribute values".

The "local id" is unique to a MOI within the scope of its associated TMN agent and serves as a database key. A one-to-one relationship exists between the "local id" and the "distinguished name" of each MOI.

Only one "stream of persistent attribute values" exists for each managed object instance. Thus, a unique "stream of persistent attribute values" exists for each MOI. The stream serves as a storage area for any attribute that is not stored individually. This allows the addition of serializable data to the stream.

If explicitly configured, an attribute can be stored as an "individual persistent attribute value" instead of being stored in a stream. For example, some TMN manager to agent interactions update an attribute frequently, such as locking an instance and unlocking an instance. Storing the "locked or unlocked attribute value" individually—creating an "individual persistent attribute value"—imposes minimal impact on database performance because the stream of persistent attribute values is not touched.

The enhanced configuration features allow modification of the database value representations of both the stream attribute and individual attributes. For example, the encoding or packing mechanism used for the stream attribute or individual attributes can be customized or optimized as needed for a specific implementation. Additionally, it is possible to use the "local id" of a MOI instead of the "distinguished name" when indexing to and manipulating relationship attributes.

The translation of a CMIP request into a database independent database operation is part of the runtime environment and is implemented in a manner that allows for support of any database. During execution, incoming CMIP requests are translated to a suitable database command. CMIP requests include "M-CREATE", "M-GET", "M-SET", "M-DELETE", "M-ACTION", and "M-CANCEL-GET."

The system determines when to perform which database operation. It guarantees maximum consistency between main memory and the database representation of a managed object instance, minimizes the number of database operations and reduces the complexity of database operations.

External CMIP requests which will be performed against managed object instances in the agent's MIB, as well as local operations performed among managed objects instances within the TMN Agent MIB are supported by this system. An API is available to explicitly force database operations. Further, this method supports simultaneous parallel processing of multiple incoming requests, or multiple replicated instances of a single request During processing of a CMIP request, the target instances are determined and then loaded from the database if they are not in the cache. The MOI cache maintains the target instances during the processing of the request.

Support for an adaptive MOI cache applied to TMN Agent MIBs provides greater flexibility and performance enhancements. The MOI cache retains a cache copy of the most recently used managed object instances in the agent. The number of instances in a single persistent agent process is limited mainly by the size of the persistent database and can be millions. If millions of instances existed uniquely in memory, vast amounts of memory would be required.

Two important MOI cache configuration parameters are "cache maximum size" and "cache reset size." The cache maximum size is a configurable upper limit that indicates the maximum number of managed object instances that can normally be concurrently stored in the cache. The cache reset size is the maximum number of managed object instances the cache can contain after an instance unload.

Further, the MOI cache is thread-safe to support parallel execution of multiple requests.

Persistent MIBs allow for fast agent restart. When the agent process is shut down intentionally or accidentally, it is guaranteed that the persistent database contains all agent MIB information. As a result, when the agent is restarted, the MIB information can be rapidly retrieved. The MOI caching mechanism also provides for fast restart by allowing the TMN agent to begin normal operation after retrieval of only minimal MOI information from the persistent database. Fast agent restart requires only the MOI containment tree, and each MOI's distinguished name, managed object class, and name binding information to be loaded from the persistent database. Once this small amount of information is loaded, the TMN agent is able to begin full normal operation. On average, this approach is orders of magnitude more performant than loading all MOI data from the persistent database into the agent's memory.

The MIB to Database mapping contains one table for each Managed Object Class supported by the MIB. The table stores the attributes and user defined data. The attributes inherited from the super classes and the attributes defined in the class itself are represented in the same table. Therefore, time consuming join operations are not necessary in order to load an MOI from the database into main memory.

Another table stores the "Containment Tree" information. The "Containment Tree" information includes the local id, distinguished name, object class and name binding for each managed object instance.

In the tables where attribute values are stored, the default location for attribute values is a special column which is referred to as the "Binary Long Object" (blob.) This attribute stores the "stream of persistent attribute values." Optionally, attribute values can be stored individually in a separate columns. These are the "individual persistent attribute values." Thus, the relational database specific instantiation of the database-independent mapping includes a stream abstraction represented in a blob column, and individual abstractions in separate database columns.

All incoming CMIP requests are translated to suitable database operations in an appropriate database language, for example, as structured query language ("SQL") queries. The following illustrates mapping CMIP requests to SQL queries. The CMIP "M-Create" command is translated to the SQL "INSERT" command, the CMIP "M-SET" command is translated to an SQL "UPDATE" command, and the CMIP "M-DELETE" command is translated to a the SQL "DELETE" command. Except for the "M-CREATE" request, the processing of a CMIP request for a managed object instance may result in that instance having to be loaded dynamically into the MOI cache. In this case, a "SELECT" command is used to retrieve the information from the database.

If the underlying operating and database management systems support multi-threading, multiple requests can be translated simultaneously. A separate thread is used for each incoming CMIP request. The thread-safeness is achieved by using mutually exclusive semaphores. These semaphores protect the critical regions of the cache implementation.

The MOI cache is implemented using a balanced binary tree. The balanced binary tree contains one entry for each managed object instance. The instance itself is created only when it is loaded into the cache.

An embodiment of the present invention could be developed using Oracle's relational database management system.

The following is an illustrative embodiment of the invention.

Figure 3:
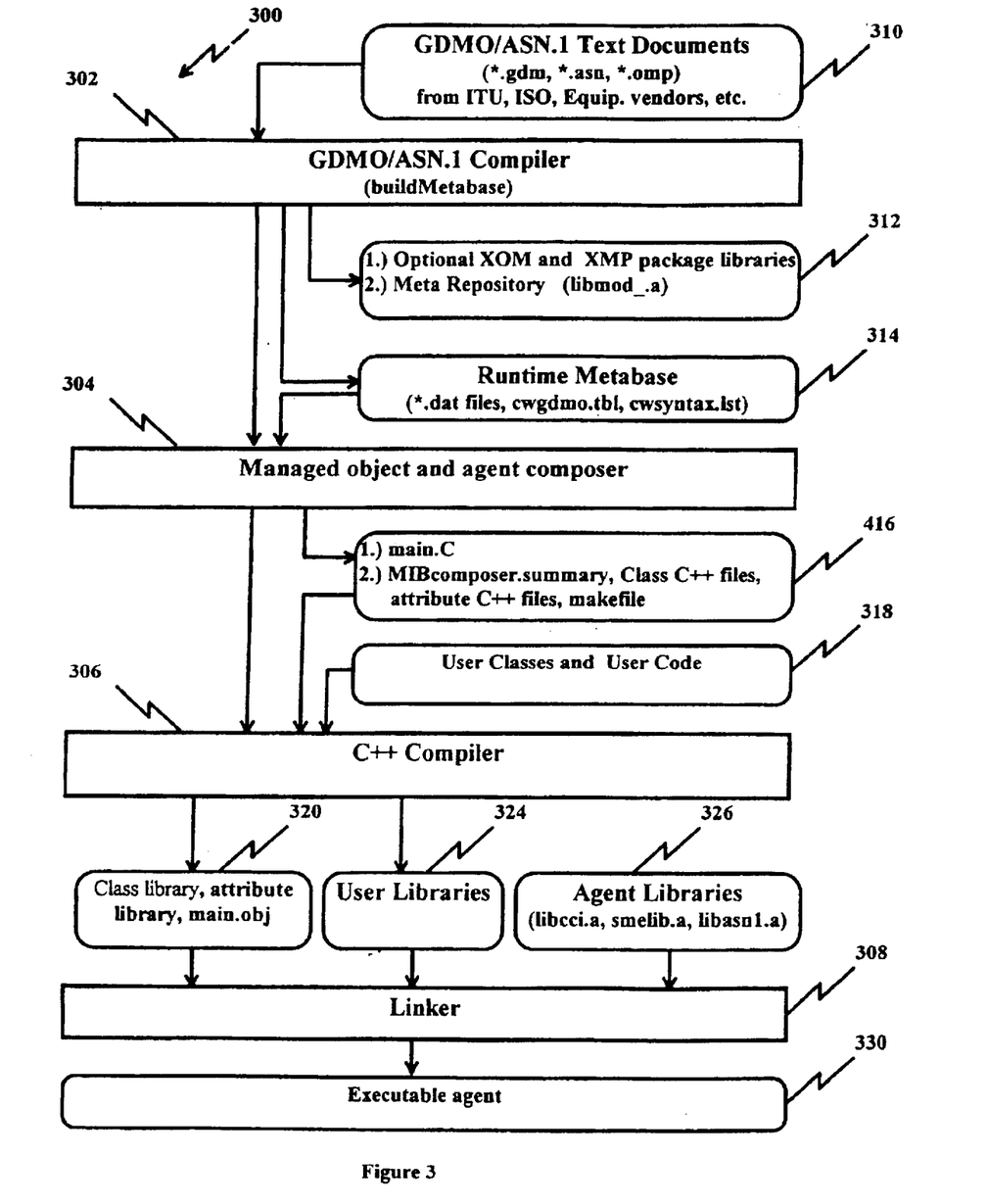
FIG. 3 is a representation of a development environment of the system of FIG. 1.

Now turning to FIG. 3, the development environment 300 illustrates the development process used to generate executable agents. The four main steps in the development environment 300 include the GDMO/ASN.1 compiler 302; the managed object and agent composer 304; the C++ Compiler 306; and the linker 308.

The GDMO/ASN.1 compiler 302 utilizes GDMO/ASN Text Documents 310 that include files with the extensions of "gdm", "asn", and "omp." These files define all of the standard characteristics of the managed object classes that are known by TMN agents. These files can be obtained from a variety of sources including being provided by the International Telecommunication Union ("ITU"), the International Standards Organization ("ISO"), equipment vendors, or other sources. From the input GDMO/ASN.1 Text Documents 310, the GDMO/ASN.1 compiler 302 generates compiled, machine readable versions of the GDMO/ASN.1 Text documents 312 and a runtime metabase 314. The compiled, machine readable versions of the GDMO/ASN.1 Text documents 312 include optional XOM and XMP package libraries which support ASN.1 encoding/decoding of information, and a Meta Repository which contains binary representations of all documents. The information in the Meta Repository has all intra-document and inter-document references and relationships verified for consistency and completeness. The runtime metabase 314 includes data files with the extension of "dat," the table file "cwgdmo.tbl," and "cwsyntax.lst". The "dat" files support runtime encoding/decoding of ASN.1 datatypes. The "cwgdmo.tbl" table holds the structure and relationship information of GDMO defined constructs. The "cwsyntax.lst" file defines the complete set of GDMO/ASN.1 document information that will be available into the runtime environment when this metabase is loaded.

The managed object and agent composer 304 is executed after the GDMO/ASN.1 compiler 302 finishes. The managed object and agent composer 304 utilizes the runtime metabase 314 to learn all of the standard information about the managed object classes the executable agent 33 will support at the end of this process. The managed object and agent composer 304 generates the files 416. The files 416 compose the C++ source code for the standard components of the executable agent 330. The files 416 include "main.C," "MIBcomposer.summary", Class C++ files attribute C++ files, and a makefile.

The C++ Compiler 306 is executed after the managed object and agent composer 304 finishes. The C++ Compiler 306 uses the files 416 and user classes and user code 318. The compiler generates the files 320, which include class library, attribute library, and the main.obj file and the user libraries 324.

The Linker 308 is executed after the C++ Compiler 306 finishes. The Linker 308 uses the files 320, the user libraries 324, and agent libraries 326. The agent libraries 326 provide base functions which are needed for all executable agents 330, and include, among others, the files "libcci.a," "smelib.a," and "libasn1.a." The Linker 308 generates the executable agent 330 that is used in the run-time environment of FIG. 4

Figure 4:
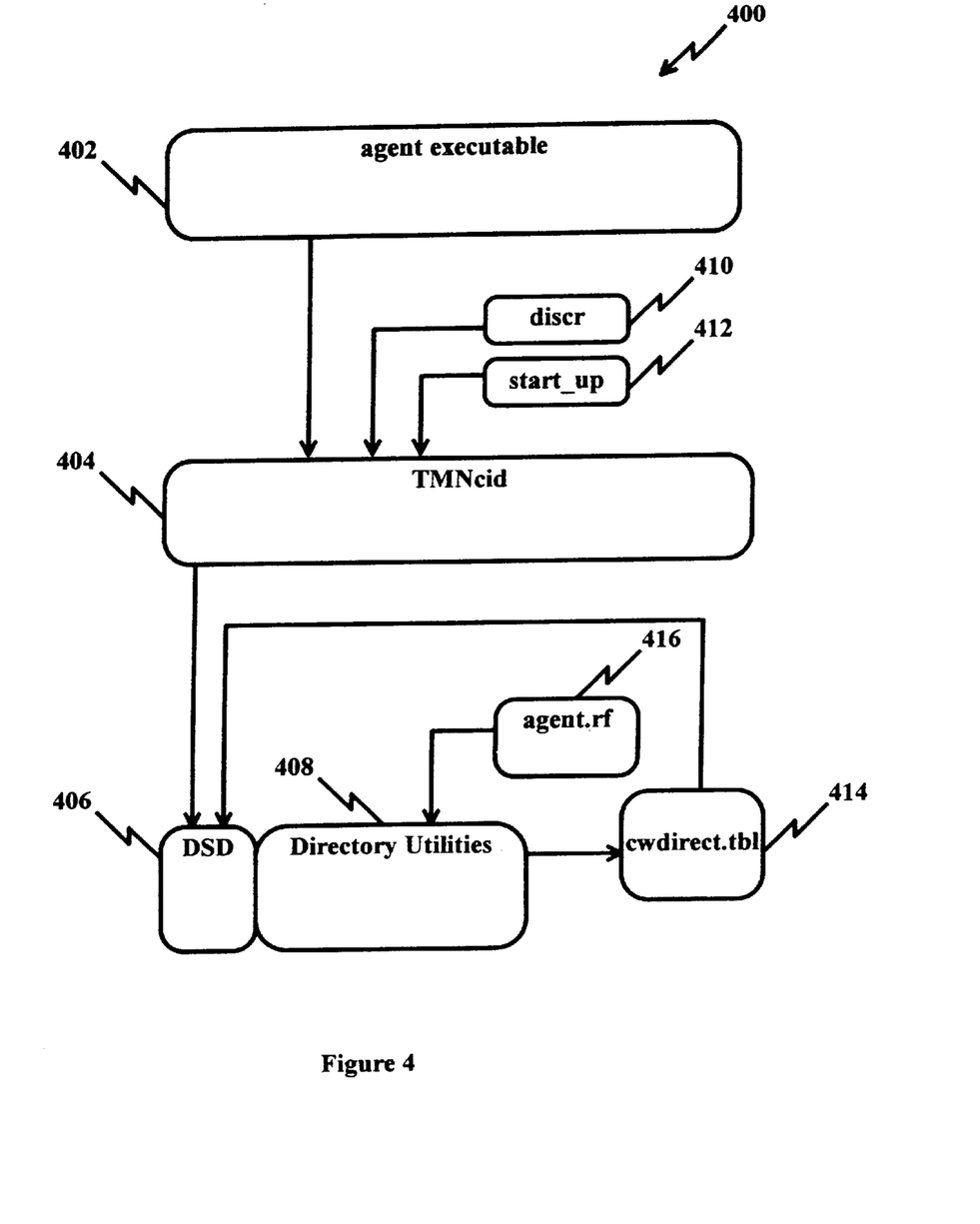
FIG. 4 is a representation of a run-time environment files of the system of FIG. 1.

In FIG. 4, the run-time environment 400 illustrates the processes and files related to the agent executable 402 which, together, cooperate to form an executing agent system. The main elements of the run-time environment 400 include the agent executable process 402, the TMNcid process 404, the DSD process 406, and the Directory Utilities process 408. The agent executable 402 implements the TMN agent. The TMNcid 404 implements the infrastructure 106 portion of the protocol hierarchy 102. (TMNcid is an acronym for TMN Communication Infrastructure Daemon.) The DSD 406 implements the directory service. The Directory Utilities 408 implement the registration of entities in the directory service. The TMNcid uses the "discr" process 410 for CMIP Event filtering, and the "start_up" file 412 for start-up configuration information. The directory utilities 408 utilizes the agent.rf file 416 to register entities into the directory service, and generates cwdirect.tbl file 414 which contains the directory information. The DSD 406 uses cwdirect.tbl file 414 when fulfilling service requests for information stored in the directory.

Figure 5:
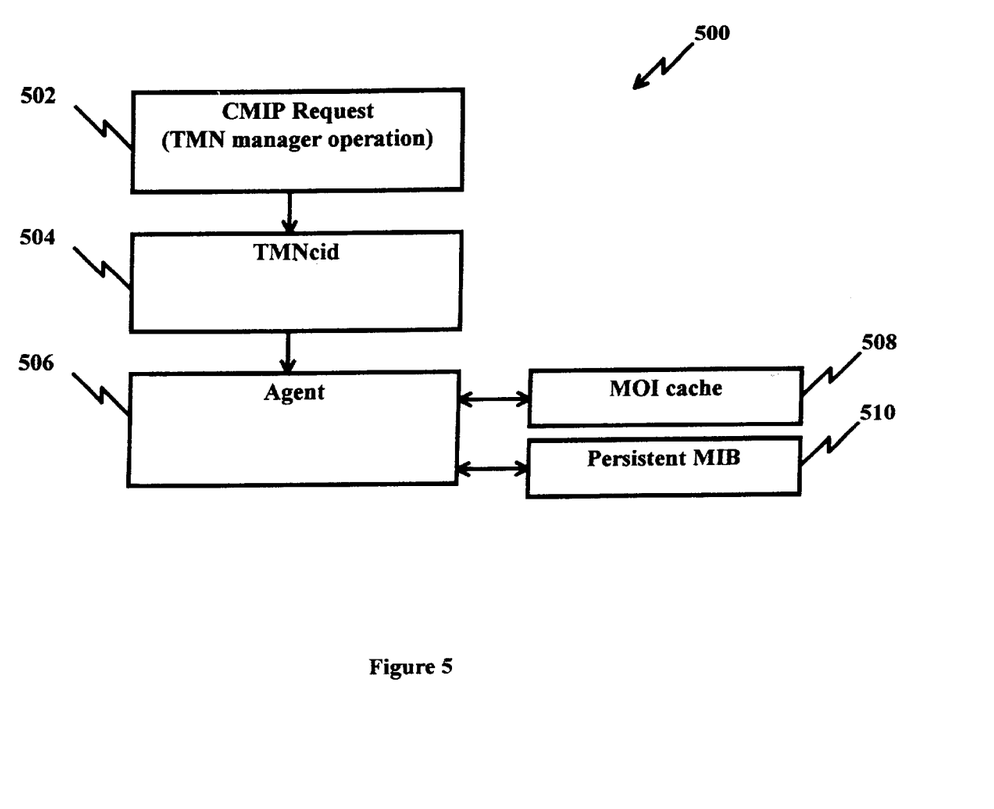
FIG. 5 is a representation of a run-time environment of the system of FIG. 1.

In FIG. 5, the run-time environment 500 illustrates the execution of a CMIP request to a TMN executable agent. The run-time environment 500 includes a TMN manager operation (a CMIP Request 502,) TMNcid 504, and agent 506. A common management information protocol ("CMIP") request 502 is received that contains a TMN operation such as "Create," "Get," "Set," Action, or "Delete." The TMNcid 504 processes the CMIP Request 502. The TMNcid 504 then forwards the CMIP request to the agent 506. The agent 506 determines which managed object are the targets of the CMIP request, and then loads and unloads MOI data to or from the MOI cache 508 as appropriate, in order to be able to perform the CMIP request. The MOI cache 508 retains the most recently used managed object instances. The agent 506 accesses the persistent MIB 510 as needed to load and unload MOI data to or from the MOI cache 508. Examples of persistent MIB access may be to insert, delete, select, update, or perform other operations using a database query language such as data manipulation language ("DML"). An example of a suitable database for use as a persistent MIB is Oracle's RDBMS.

Figure 6:
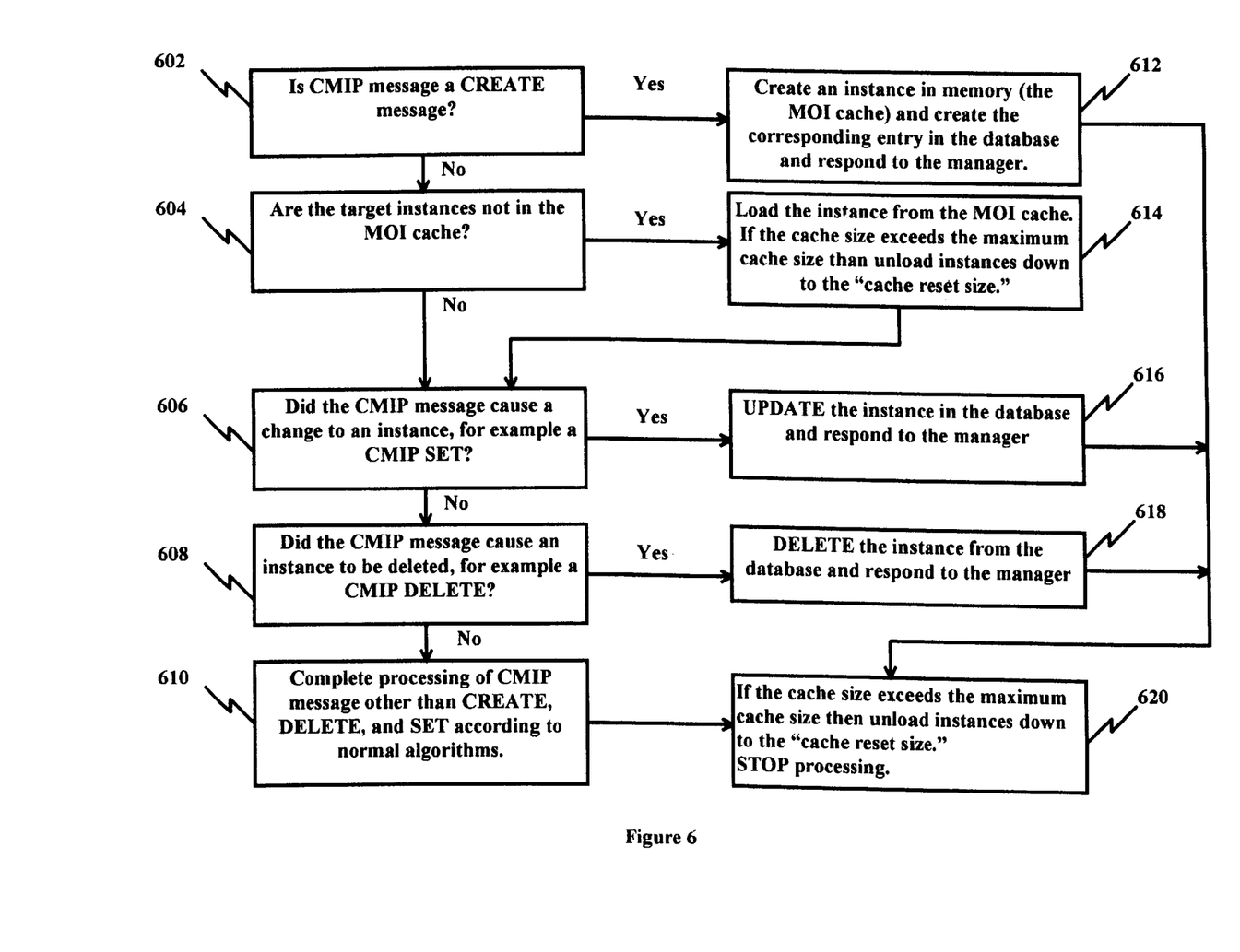

Referring to FIG. 6 the logical sequence of steps that the TMN agent performs when processing a CMIP request is shown. In step 602, the CMIP message is analyzed to determine if it is a CREATE message. If it is, the instance is created in the MOI cache which is in memory, and the corresponding instance entry is created in the database, as shown in step 612. Then the next step is 620. Creating an entry in the database requires inserts into 2 tables, for example, "insert into system (localId, notifid, operationalState, administrativeState, stream) values (1001, 1, "enable", "unlock", etc.);" and "insert into MOI (localId, isvalid, objectclass, namebinding, dn) values (1001, "y", "2.9.3.2.3.13", "1.3.18.0.0.6119", "1.3.18.0.2.4.5= (\"TelcoNet\")", "2.9.3.2.7.4=(name&\"TelcoSys\")");". If the CMIP message was not a CREATE message, then the next step is 604.

In step 604, the MOI cache is analyzed to determine if it contains the instances which are the target of the CMIP request. If the instances are not contained in the cache, then the next step is 614 which loads the instances into the cache and invokes the cache size management algorithm as required. For example, loading an instance into the cache can be by executing "Select* from system where localId in (1001)." The next step is 606.

In step 606, the processing of non-CREATE CMIP messages begins. At this step, if the message results in a change to an instance in the MOI cache, that UPDATE is written to the database (in step 616). After completing the UPDATE of the instance in step 616, the cache size management algorithm is invoked in step 620 to update the MOI cache as needed. If the CMFP message did not result in a change to an instance in the MOI cache, then the next step is 608. In step 608, if the CMIP message results in an instance being deleted, that DELETE is propagated to the database (in step 618). For example, corresponding to the 2 table inserts which are required during CMIP MOI creation, 2 table deletes are required during CMP MOI deletion. The 2 database table deletes needed to accomplish a CMIP MOI deletion could be "Delete from system where localId=1001" and "Delete from MOI where localId=1001." After completing the DELETE of the instance in step 618, the cache size management algorithm is invoked in step 620 to update the MOI cache as needed. If the CMIP message did not result in the deletion of an instance in the MOI cache, then the next step is 610.

In step 610, other aspects of CMIP operation processing like responding to a GET request, routing an incoming EVENT, or processing of an ACTION occur. If these operations subsequently cause UPDATEs or DELETEs of instances (for example, by issuing local CMIP SET or DELETE requests) then their execution leads recursively through this flowchart again. If these operations do not subsequently cause UPDATEs or DELETEs of instances, then their completion leads directly to step 620.

In step 620, the current cache size is checked to determine if it exceeds the maximum allowable cache size. If it does, the Least Recently Used instances which are not currently locked and which are not marked as "never to be deleted" are deleted until the cache size has reached the "cache reset size."

While the invention has been disclosed in conjunction with the preferred embodiment, various modifications may be made in form and substance therein by those skilled in the art without departing from the spirit and scope of the invention, as defined in the appended claims.

What is claimed is:

1. In a telecommunication management network, a method of managing memory to ensure that data maintained within an agent is non-volatile, comprising the steps of:
   (a) analyzing within an agent a common management information protocol (CMIP) message, which identifies one or more requested target instances, to determine if the requested target instances are in a cache of the agent;
   (b) loading the requested target instances into the cache from a persistent database within the agent if they did not already exist in the cache;
   (c) analyzing within the agent the CMIP message to determine if the CMIP message changes the value of the requested target instances in the cache;

(d) synchronizing the values of the requested target instances between the cache and the persistent database if the CMIP message changes the value of the requested target instances in the cache, for maintaining a consistent state across restarts of the agent in the event of agent failure or unexpected termination in a telecommunication management network;

(e) analyzing the cache size to determine if the cache size exceeds a preconfigured limit;

(f) identifying instances in cache that are least recently used instances; and (g) removing from cache the instances identified as the least recently used instances.

2. The method of claim 1 wherein the identifying step, step (f), further includes the step of evaluating only the instances in the cache that are marked as able to be deleted and are not locked.

3. The method of claim 1 further comprising after step (b), the steps of:

(b1) analyzing in the agent the CMIP message to determine if the CMIP message is a delete message;

(b2) deleting the requested target instances from the cache and from the database while ensuring transactional consistency between the database and the cache.

4. The method of claim 1 wherein the steps (a) and (b) further include the step (i) if the semantics of the CMIP message allow multiple operations to proceed on one or more managed object instances in parallel, then dispatching the operations on multiple threads of execution simultaneously.

5. A telecommunication management network (TMN) for managing memory to ensure that data maintained within an agent is non-volatile and optimized for rapid re-initialization in the event of failure of a TMN agent, comprising:

(a) means within a TMN agent for analyzing a common management information protocol (CMIP) message, which identifies one of more requested target instances, to determine if the requested target instances are in a cache of the TMN agent;

(b) means for loading the requested target instances from a persistent database within the TMN agent into the cache from if they did not already exist in the cache;

(c) means within the TMN agent for analyzing the CMIP message to determine if the CMIP message changes the value of the requested target instances in the cache;

(d) means for synchronizing the values of the requested target instances between the cache and the persistent database if the CMIP message changes the value of the requested target instances in the cache, for maintaining a consistent state across restarts of the agent in the event of agent failure or unexpected termination in a telecommunication management network;

(e) means for analyzing the cache size to determine if the cache size exceeds a preconfigured limit;

(f) means for identifying instances in cache that are least recently used instances; and (g) means for removing from cache the instances identified as the least recently used instances.

6. The network of claim 5 further comprising:

(h) means for evaluating only the instances in the cache that are marked as able to be deleted and are not locked.

7. The network of claim 5 further comprising:

(i) means for analyzing the CMIP message to determine if the CMIP message is a delete message;

(j) means for deleting the requested target instances from the cache and from the database while ensuring transactional consistency between the database and the cache.

\* \* \* \* \*